United States Patent

[11] 3,619,516

[72] Inventors Allan S. Miller
Wellesley;
Paul L. Vitkus, Bedford, both of Mass.
[21] Appl. No. 19,412
[22] Filed Mar. 13, 1970
[45] Patented Nov. 9, 1971
[73] Assignee Norton Research Corporation
Cambridge, Mass.
Continuation-in-part of application Ser. No.
556,408, June 9, 1966, now Patent No.
3,508,015, Continuation-in-part of
application Ser. No. 646,057, June 14,
1967, now abandoned.
The portion of the term of the patent
subsequent to Apr. 21, 1987, has been
disclaimed.

[54] ELECTROLUMINESCENT DIODE SOUND
REPRODUCING SYSTEM
4 Claims, 1 Drawing Fig.
[52] U.S. Cl. ................................................ 179/100.3 Z,
313/108 D, 317/235 N, 346/107 R
[51] Int. Cl. ....................................................... G01d 9/42,
G11b 7/12, H05b 33/16

[50] Field of Search .......................................... 179/100.3
T; 346/107–108; 313/108 D; 317/235 (27);
148/33, 33.4; 250/211 J, 217 SS; 331/94.5;
340/173 LT; 307/311–312

[56] References Cited
UNITED STATES PATENTS
2,776,367 1/1957 Lehovec ...................... 179/100.3 UX
3,508,015 4/1970 Miller et al. .................. 179/100.3

Primary Examiner—Terrell W. Fears
Assistant Examiner—Raymond F. Cardillo, Jr.
Attorneys—Oliver W. Hayes and Jerry Cohen ABSTRACT: A system for reading out data, such as sound, recorded on a photographic film. A light-emitting diode is positioned with its light-emitting edge less than 0.001 inch from the path of travel of the film. The diode has a transparent region adjacent the PN junction, this transparent region being less than 0.001 inch thick as measured in the direction of film travel and being sandwiched between two opaque layers. A detector is provided on the opposite side of the film to detect the light modulated by the recorded image in the film.

"t"—LESS THAN .001 INCH
"d"—LESS THAN .001 INCH
"p+"—IS OPAQUE
"n"—IS TRANSPARENT
"n+"—IS OPAQUE

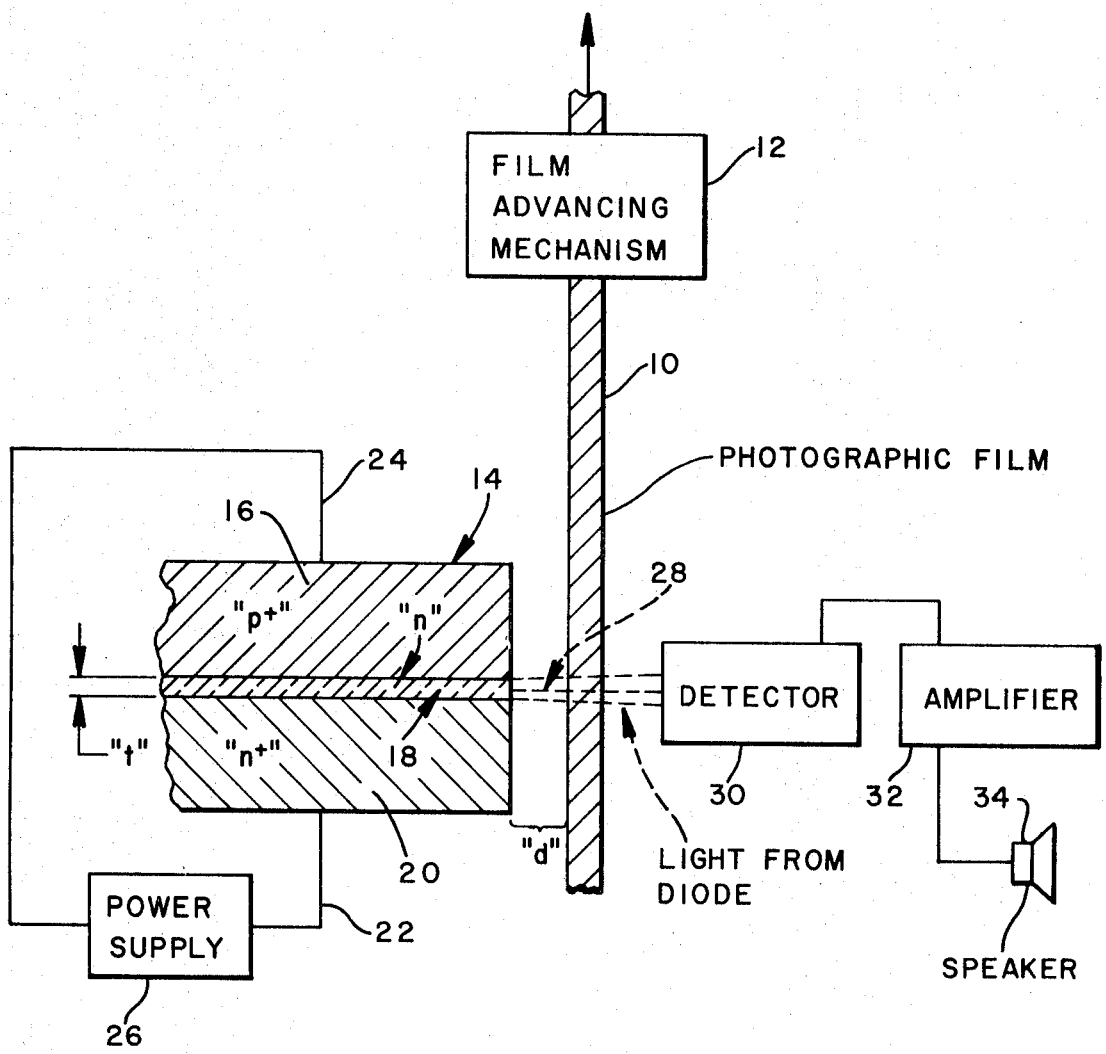
"t"—LESS THAN .001 INCH
"d"—LESS THAN .001 INCH
"p+"—IS OPAQUE
"n"—IS TRANSPARENT
"n+"—IS OPAQUE

ELECTROLUMINESCENT DIODE SOUND REPRODUCING SYSTEM

The present invention relates to improved systems for reading out data, such as sound, recorded on film. This application is a continuation-in-part of copending application Ser. No. 556,408, filed June 9, 1966, now U.S. Pat. No. 3,508,015 and is a continuation-in-part of copending application Ser. No. 646,057, now abandoned filed June 14, 1967.

PRIOR ART

For many years, the art has searched for better methods of reproducing sound or other data recorded on photographic film, particularly for the reproduction of sound motion pictures. Present commercial systems involve either the use of magnetic tape or complex optical systems. Typical of the prior art is the combination of a tungsten bulb, several lenses and a slit to produce a narrow image which is projected on the film. This is costly, bulky, somewhat fragile, produces considerable heat and provides a potential source of noise from the infrared component of the light source.

It is a principal object of the present invention to provide an improved sound reproducing system which obviates the difficulties of the prior art.

SUMMARY OF THE INVENTION

The invention is particularly concerned with the production of a sound reproducing system containing a narrow efficient electroluminescent junction diode as a source of light for reading out a developed image on a photographic film. The diode is preferably positioned within 0.001 inch of the surface of the photographic film so that light coming out of one edge of the junction impinges directly on the film. The diode is preferably silicon carbide and preferably has a heavily doped base crystal which is substantially opaque, a thin (less than 0.001 inch) transparent epitaxial layer on the base crystal forming a PN-junction therewith, and an overlying heavily doped region in the epitaxial layer which is also substantially opaque to emitted light. The light emitting silicon carbide light source combines the functions of light source, filter and image shaper in a single, small, rugged device. The filter aspect of this source comes about as a result of the predominantly visible character of the light emitted from the diode. The light intensity is 10 percent maximum or less in the infrared region of 7,500 to 10,000 A. where color film has a high-noise producing-transmission. This is in contrast with the normal tungsten filament whose emission peaks in the vicinity of 10,000 A. The simultaneous use of the tungsten filament exciter lamp with color film and an infrared sensitive silicon junction photodetector has resulted in high-noise levels. Since the film cannot be changed, a filter had to be interposed between the source and detector adding to the cost. The silicon carbide light emitting diode, having very little infrared, requires no filter.

In one preferred embodiment of the invention, the diode comprises a silicon carbide crystal containing a high concentration of aluminum in excess of 1,000 p.p.m. and a thin transparent epitaxial "$n$" layer grown on the aluminum-doped base crystal. Such a three-layer diode is preferably formed by the procedure described in example 1 of our copending application Ser. No. 556,408, filed June 7, 1966, now U.S. Pat. No. 3,508,015. Additionally, it may be formed by the technique described in example 1 of the copending application of Kamath, Ser. No. 840,255, filed July 9, 1969, now U.S. Pat. No. 3,565,703. In such a case it is preferred to start with an $N^+$ base crystal to make an $N^+N$ (transparent) $P^+$ three-layer diode.

In order that the invention may be more fully understood, reference should be had to the highly diagrammatic, schematic representation shown in the accompanying drawing. In this drawing, the photographic film is indicated at 10, this film being suitably advanced, preferably at constant speed, by a film advancing mechanism schematically indicated at 12. Closely adjacent the film is positioned a junction diode shown generally at 14, this diode preferably comprising a heavily doped "$P^+$" section 16, a transparent "$n$" layer 18 and a heavily doped "$N^+$" section 20. The edge of the junction is spaced by a distance "$d$" (preferably less than 0.001 inch) from the surface of the film. As indicated on the drawing, the width of the transparent "$N$" section of the diode (shown as "$t$") is preferably less than 0.001 inch. A pair of leads 22 and 24 are schematically indicated as connecting the diode to a power supply 26.

In one embodiment of the invention, a silicon carbide junction diode was prepared as described in the above-mentioned parent application, Ser. No. 556,408. The light beam generated by this diode (shown at 28) was sharply defined and was emitted from the very narrow transparent region of the PN junction. This narrow light emitting junction region was less than 0.0005 inch wide.

The diode is positioned so that one edge is within 0.001 inch of a developed photographic film containing a recorded sound track. When the diode is suitably mounted, it may actually contact the surface of the film, preferably the emulsion surface on which the sound track is recorded. On the opposite side of the film there is positioned a photodetector 30 for receiving light in the beam 28 which has been modulated by passing through the sound track. The output of this detector 30 is amplified by amplifier 32 and then used to drive a speaker 34, thus reproducing the sound recorded on the sound track. In one preferred embodiment of the invention, the photodetector is an EG&G silicon diffused photo diode Model SGD 100. This photo diode is provided with a guard ring and has a spectral response in the region of 0.35 to $1.13\mu$. It is preferably coupled to an FET Model 100 low-noise preamplifier (made by United Detector Technology) which can be the first stage of the amplifier 32.

While the invention has been primarily described in connection with its use for sound reproduction, it equally can be employed for reproducing other data, such as digital data recorded for use in computers and display systems.

Several preferred junctions comprising a $P^+N$ $N^+$ arrangement and an $N^+N$ (transparent) $P^+$ arrangement of layers are described above. It can also be a $P^+P$ (transparent) $N^+$ structure. Additionally, while the preferred form of diode comprises silicon carbide, other light emitting diodes having a very narrow region (<0.001 inch) transparent to the emitted light adjacent the PN-junction can be employed. Examples of such diodes are gallium phosphide and gallium arsenide phosphide.

Since certain changes can be made in the above product without departing from the scope of the invention herein involved, it is intended that all matter contained in the above description shall be interpreted as illustrative and not in a limiting sense.

What is claimed is:

1. A system for reproducing data such as sound recorded on photographic film and comprising means to create relative movement between the photographic film and a light source, the relative movement modulating a beam of light passing through the film and striking a photodetector to create a modulated electrical signal, characterized in that the light source comprises a light emitting junction diode having an edge of the junction positioned less than 0.001 inch from the film so that the light emitted from such edge impinges directly on the film, the narrow dimension of the diode edge aligned with the direction of relative movement, the junction being formed between a first opaque layer of P or N conductivity material and a layer of the opposite conductivity material transparent to light emitted at the junction, the thickness of the transparent layer as measured in the direction of relative movement being less than 0.001 inch, the opposite side of the transparent layer joined to another opaque layer, and means operatively connected to the photodetector for reproducing the data corresponding to the modulated light beam.

2. The system of claim 1 wherein the diode is formed of silicon carbide.

3. The system of claim 1 wherein the transparent layer is transparent to visible light.

4. The system of claim 1 wherein the diode emits light predominantly in the visible region and the detector has a spectral response in the region of 0.35 to 1.13μ.

* * * * *